United States Patent [19]
Benson

[11] Patent Number: 5,370,370
[45] Date of Patent: Dec. 6, 1994

[54] LINER FOR SUBMERGED ENTRY NOZZLE

[75] Inventor: Paul M. Benson, Pittsburgh, Pa.

[73] Assignee: Vesuvius Crucible Company, Wilmington, Del.

[21] Appl. No.: 23,902

[22] Filed: Feb. 19, 1993

[51] Int. Cl.$^5$ .............................................. B22D 41/54
[52] U.S. Cl. .................................... 266/236; 266/280; 222/590; 222/606; 222/607; 501/100
[58] Field of Search ............... 266/227, 236, 280, 286; 222/590, 591, 606, 607; 501/94, 99, 100, 101

[56] References Cited

U.S. PATENT DOCUMENTS

| | | | |
|---|---|---|---|
| 4,870,037 | 9/1989 | Hoggard et al. | 501/100 |
| 4,913,408 | 4/1990 | Hoggard et al. | 266/280 |
| 4,953,762 | 9/1990 | Villani | 222/606 |
| 4,989,762 | 2/1991 | Ando et al. | 222/607 |
| 5,083,687 | 1/1992 | Saito et al. | 222/591 |
| 5,188,989 | 2/1993 | Winkelbauer et al. | 501/100 |
| 5,198,126 | 3/1993 | Lee | 222/606 |

FOREIGN PATENT DOCUMENTS

| | | |
|---|---|---|
| 2110971 | 6/1983 | Japan . |
| 3161152 | 7/1991 | Japan ................................. 222/606 |
| 3243258 | 10/1991 | Japan ................................. 222/606 |
| 2111880 | 7/1983 | United Kingdom . |
| 2135918 | 9/1984 | United Kingdom . |
| 2170131 | 7/1986 | United Kingdom . |

Primary Examiner—Scott Kastler
Attorney, Agent, or Firm—Webb Ziesenheim Bruening Logsdon Orkin & Hanson

[57] ABSTRACT

A fired carbon-bonded, oxide refractory body for use in casting aluminum-killed steel has a metal contacting surface which is resistant to both steel erosion and buildup of alumina. The layer is formed by first firing the pressed body in an oxidizing atmosphere to form a porous oxidized zone on selected steel contacting surfaces. The remaining surface portions of the body are protected against oxidation during firing by a glaze applied prior to firing. A carbon free refractory slip or slurry is infiltrated into the porous oxidized zone to create the erosion and buildup resistant surface layer. A preferred infiltrant material is alumina.

19 Claims, 1 Drawing Sheet

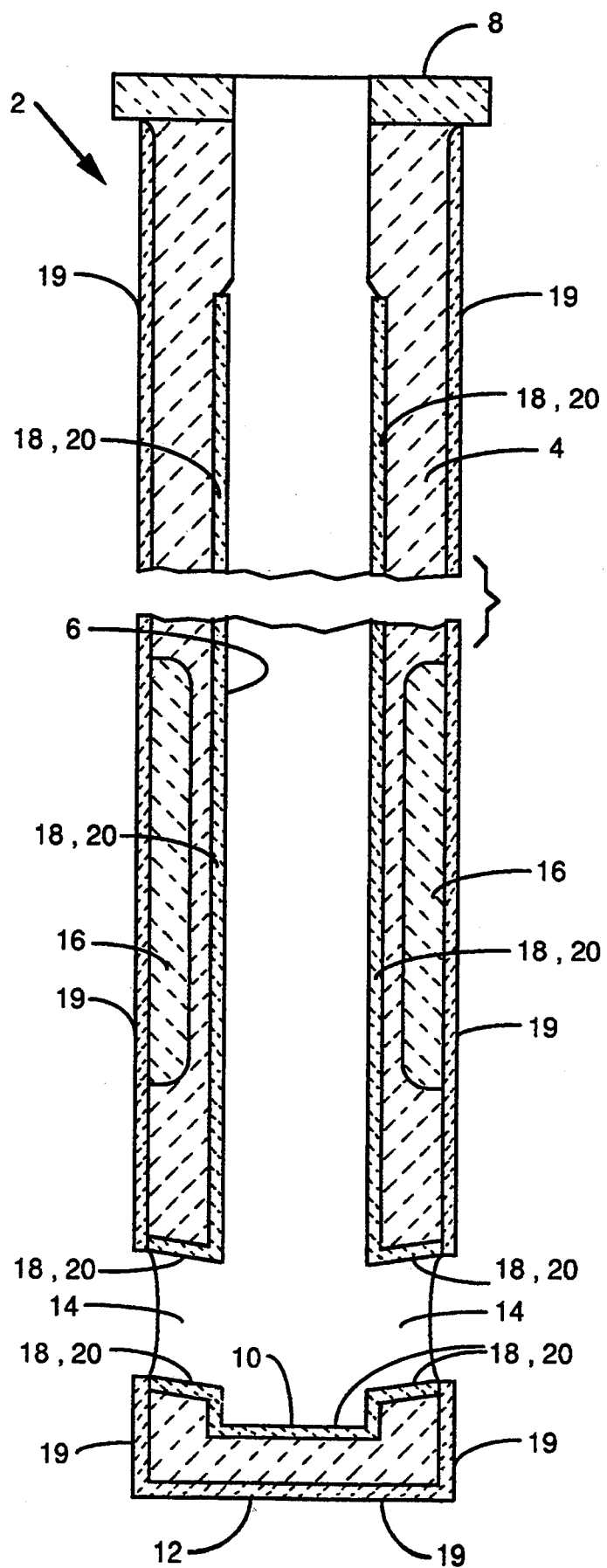

LINER FOR SUBMERGED ENTRY NOZZLE

BACKGROUND OF THE INVENTION

In the continuous casting of steel, special refractories are used to control the flow of the molten steel and protect the molten steel from oxidation as it is poured from a ladle to a tundish and from the tundish to a continuous casting mold. Such refractories include slide gate plates and/or stopper rods used to control the flow of the molten metal. In addition, these special refractories include various nozzles associated with the ladle and tundish, such as protective ladle shrouds and submerged pouring nozzles, which are employed to protect the molten metal from oxidation. These refractories are subjected to severe operating conditions such as thermal shock, molten steel erosion, and slag attack.

The above-mentioned special refractories are usually carbon-containing refractories and, more specifically, carbon-bonded refractories. They are conventionally composed of one or more oxide refractory grains such as alumina, zirconia, clays, magnesia, silicon carbide, silica, or other dense grain of specific mesh size. These refractories also generally contain significant amounts of carbon in the form of graphite, amorphous graphite, carbon black, coke and like carbon sources plus a carbonaceous binder derived from pitch or resin.

Some oxidation takes place during the manufacture of steel, and considerable amounts of oxygen may dissolve in the molten metal. In the ensuing solidification of the steel during casting, much of the dissolved gas is expelled and, in the case of oxygen, it reacts with carbon to produce evolved carbon monoxide. The dispelled oxygen, carbon monoxide and other gases create undesirable porosity, cracks, and internal defects which lower the quality of the finished steel. In order to eliminate the problem of dissolved oxygen, molten steels are deoxidized or "killed" by the addition of aluminum metal, ferromanganese, or ferrosilicon. In the case of aluminum-killed steel, the aluminum reacts with dissolved oxygen or iron oxide to form finely dispersed aluminum oxide, some of which floats into the slag above the molten steel and some of which remains as highly dispersed micro particles in the solidified steel. During continuous casting, this extremely fine dispersed portion of alumina has a tendency to either precipitate out of the molten steel onto the cooler refractory surfaces or react and stick to the ceramic refractories that control the molten steel in its path from ladle to tundish to casting mold.

This precipitated alumina has a particular affinity to the typical carbon-bonded, alumina-graphite refractories commonly utilized as ladle shrouds and submerged pouring nozzles, the latter also referred to as a subentry nozzle or simply as a "SEN". The alumina will continue to build up in the interior of the nozzle until the flow of molten steel is reduced to a point where the tube must be lanced open by an oxygen torch or the SEN is discarded. If oxygen lancing becomes necessary, the casting process is disrupted costing time and money—casting efficiency decreases, and the quality of the steel must be downgraded. A total alumina blockage of a SEN decreases the expected life of the refractories and is very costly to steel producers. In alumina-killed steels where high dissolved oxygen concentrations are expected, the useful life of a submerged pouring nozzle may be limited to 2-3 ladles due to heavy alumina buildup on the interior diameter of the tube.

Heretofore, one of the solutions to this problem has been the development of an argon injected nozzle, which allows high pressure argon to permeate the porous interior diameter of the nozzle during casting, thereby forming a protective layer of inert gas which hinders the bonding of the dispersed alumina to the refractory. The argon also reduces the oxygen partial pressure at the refractory-molten metal interface, again decreasing the possibility for adherence of alumina deposits. Exemplary of such is the gas permeable immersion pouring nozzle disclosed in U.K. Patent Application GB 2,111,880 A to Gruner et al. The argon-injection technology has extended nozzle life a step further at an ever increasing cost—the expense of large volumes of argon required during casting and the increased manufacturing costs of the more complex SEN-argon nozzles.

It has also been proposed to provide a pouring nozzle with a lower melting point liner composition which prevents alumina buildup. Liner materials developed to date include the use of $CaO-MgO-Al_2O_3$ liners, as disclosed in U.K. Patent Application GB 2,170,131 A to Tate, which develop low melting eutectics (between 1350°–1600° C.) which are washed out of the nozzle as alumina is deposited and reacts with the liner. The melting action prevents the alumina buildup and allows for the free flow of molten steel. Also reported to be effective in prevention of alumina adhesion is a sleeve of Magnesium oxide (MgO), according to U.K. Patent Application GB 2,135,918 to Rosenstock et al.

It has still further been proposed in U.K. Patent Application GB 2,110,971 A to Kurashina et al. to provide a submerged nozzle of a modified geometry wherein the lower portion of the inner nozzle diameter is greater than the top, with an angled step therebetween to prevent blockage of the flow passage. The upper portion of the nozzle is comprised of alumina-graphite and the lower portion is zirconia-graphite.

More recently, in U.S. Pat. No. 4,870,037 to Hoggard et al., owned by the assignor of the instant invention, an anti-buildup liner of a carbon-bonded, SiAlON-graphite refractory composition has been proposed. A still further attempt to minimize alumina buildup in pouring nozzles is set forth in commonly owned U.S. Pat. No. 4,913,408 to Hoggard et al. which discloses a nozzle liner composition of carbon and a composite selected from the group consisting of zirconia and O'—SiAlON and zirconia and silicon oxynitride.

While these SiAlON based compositions exhibited improved anti-buildup properties over prior refractory compositions, some alumina deposition is still observed, although to a lesser extent. It should also be noted that SiAlON is a relatively expensive refractory material which necessarily increases the cost of the nozzle.

It is, therefore, an object of the present invention to improve the anti-buildup properties of a submerged pouring nozzle or other refractory shape while doing so in a cost effective manner.

The present invention provides a subentry nozzle suitable for casting aluminum-killed steel which substantially prevents the deposition of alumina in the bore thereof.

The present invention provides an article of manufacture of a refractory composition that is formed as an interior liner in submerged pouring nozzles, ladle shrouds, collector nozzles, slide gate inserts, and like components. The invention inhibits the buildup of alumina and other oxides on such speciality refractories used in the flow control and protection of molten steel during continuous casting of aluminum-killed steels and the like.

The invention provides a nozzle liner of a composition having similar thermal expansion properties to the alumina-graphite and zirconia-graphite refractories presently in use so as to prevent cracking during casting operations. Still further, the liner composition of the present invention provides superior steel erosion resistance, similar to the alumina-graphite body of existing SEN nozzles to allow for long casting sequences and low permeability to decrease the opportunity for unwanted oxide buildup.

The invention achieves the desired goal of reducing alumina buildup to superior levels without the need for expensive inert gas hardware and the complicated and expensive gas permeable nozzles heretofore required in such practice, or the use of expensive refractory grains.

Still further, the present invention provides a method of making an anti-buildup liner in a refractory shape such as a submerged entry nozzle.

SUMMARY OF THE INVENTION

One aspect of the invention is directed to a refractory article, such as a submerged entry nozzle for use in the continuous casting of aluminum-killed steel, having an anti-buildup liner formed therein. The body of the nozzle or like shape is made of a fired, carbon-bonded oxide refractory material, such as a carbon-bonded alumina-graphite. The teeming orifice or metal contacting bore of the nozzle is defined by an oxidized, carbon free, annular zone of about 1–3 mm in depth. The oxidized zone, when formed, is porous and is thereafter impregnated with a carbon free, refractory material selected from the group consisting of alumina, silica, zirconia and SiAlON. The preferred refractory material for impregnation is alumina. The pore size of the carbon free, oxidized zone prior to impregnation is controlled within the range of about 10 to 70 microns and preferably about 35–45 microns and, more preferably, about 40 microns. The completed nozzle having the zone and carbon free impregnated refractory liner may be low temperature cured after impregnation or it may be used without such a cure if the nozzle is subjected to a conventional preheat treatment prior to service. During high temperature service, the impregnated refractory material undergoes sintering to further densify the liner region so as to prevent liquid steel infiltration and to prevent reverse carbon monoxide emissions from the carbon-bonded refractory body into the steel. As will be discussed in greater detail hereinafter, it is believed that the reaction between the dissolved aluminum in the steel and carbon monoxide emitted from the carbon-bonded refractory is a principle reaction mechanism in the formation and buildup of harmful alumina deposits in the nozzle bore.

A method of manufacturing a refractory article having an anti-buildup liner comprises the following steps. A body or shape of a carbon-bonded oxide refractory material, such as a carbon-bonded alumina-graphite submerged entry nozzle is impressed with a teeming bore formed therethrough. The exterior of the green pressed body, i.e., those surfaces other than the bore and exit orifices communicating with the bore, are coated with a glaze forming frit. The frit coated, green shape is then fired in an oxidizing furnace atmosphere at a temperature of about 1,000° C. for a selected time, preferably about two hours for a nozzle shape. During the firing step, the body of the nozzle sinters and densifies while the glazed surfaces protect the carbon material from the furnace atmosphere. Concurrently, an oxidized zone is formed around the unglazed bore region preferably to the controlled depth and the controlled pore size set forth above. The fired body, has a glassy, glazed exterior and a carbon depleted, oxidized zone around the bore. The fired body is then preferably placed in an enclosed system and submerged in a slip or slurry containing a fine carbon free refractory powder, preferably alumina, in an organic/water vehicle. The system may be placed under a vacuum of less than 1 atmosphere for 15 minutes or more so as to remove entrapped oxygen from the oxidized zone. The system may then be pressurized to cause the refractory containing slurry to infiltrate the evacuated pores of the oxidized zone. The vacuum/pressure method of infiltrating is not critical since the slurry will infiltrate the porous oxidized zone without such an assist, although a longer immersion time in the slurry would be required. In any event, the carbon free refractory impregnated body is removed from the slurry and may then be subjected to a low temperature cure to volatize and drive off the organic/water slurry vehicle. Since most nozzles are conventionally preheated prior to service, the curing step may be eliminated.

These, as well as other features and advantages of the present invention, will become more apparent when reference is made to the following detailed description taken with the appended drawing.

BRIEF DESCRIPTION OF THE DRAWING

The single drawing FIGURE depicts a cross-sectional, side elevation view of a submerged entry nozzle having an anti-buildup liner of the present invention formed therein.

DETAILED DESCRIPTION OF THE INVENTION

As mentioned above, the premature clogging of pouring nozzles due to alumina buildup has long been a problem in the continuous casting art, particularly when casting so-called aluminum-killed steel. It has been theorized that one contributing mechanism involved in the formation and buildup of unwanted alumina in a casting nozzle and eventual piece failure is related to the formation of gaseous carbon monoxide, "CO(g)" in the nozzle body. Conventionally used carbon-bonded, oxide-based refractories such as carbon-bonded alumina graphite will generate CO(g) when exposed to molten steel temperatures. The CO will react with aluminum which is dissolved in the steel melt. The thermochemically favorable reaction is:

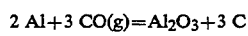

$$2\,Al + 3\,CO(g) = Al_2O_3 + 3\,C$$

This mechanism was demonstrated emperically by bubbling CO(g) into a molten bath of aluminum-killed steel. Immediately, it was observed that clusters of $Al_2O_3$ appeared, floating on the surface of the melt. It is, therefore, reasonable to assume that any melt contacting refractory material which can generate CO(g) has the potential to contribute to the unwanted formation of alumina in aluminum containing steels. It is, thus, concluded that it is important to reduce or eliminate CO(g)

emissions from refractories which exhibit alumina buildup.

A first approach in solving this problem would be to simply eliminate all carbon from the refractory composition of the pouring nozzle. This is unfortunately not a suitable solution since carbon is one of the most cost-effective constituents employed in producing steelmaking refractories, particularly in isostatic pressing nozzle shapes. Elimination of the carbon bond phase and other carbon from the refractory creates thermal shock problems, increased permeability and provides a reaction path for other oxidants to enter the melt.

I have discovered that a conventional, carbon-bonded, oxide base refractory material such as carbon-bonded alumina graphite in the form of a submerged entry pouring nozzle, can be treated in accordance with the present invention to form an anti-buildup liner therein. The resultant nozzle retains the benefits of the original material, namely, low cost, erosion and thermal shock resistance, while gaining the new attribute of being resistant to CO(g) emission. Thus, the nozzle of the invention is resistant to formation and buildup of $Al_2O_3$ when casting aluminum-killed steel.

Initial trials consisted of coating fired, carbon-bonded, alumina-graphite test specimens. A silica slurry was coated onto one side of a test specimen. The silica coated specimen was then immersed and held in a static condition in a bath of aluminum-killed steel. The specimen was removed from the melt and examined. The silica coated surface was free of alumina deposits, while the uncoated alumina graphite surface exhibited a heavy formation of alumina deposited thereon. The test specimen was then re-submerged in the steel melt and rotated to evaluate the steel erosion resistance of the silica slurry coating. The specimen after rotation in the steel melt was examined and it was observed that the specimen had lost the silica coating during the test. Thus, it was concluded that a silica slurry coating was effective in eliminating $Al_2O_3$ formation on a carbon-bonded refractory but did not possess the necessary erosion resistance required in a submerged entry nozzle, at least when applied as a surface coating.

Next, an alumina slurry was prepared and an additional test specimen was coated in the same manner as the silica slurry coated specimen. It was observed that the alumina slurry coating did not adhere to the surface of the carbon-bonded, alumina-graphite specimen and also failed in erosion testing. It is known, however, that alumina is resistant to steel erosion.

In order to take advantage of the superior erosion resistant properties of alumina, it was necessary to devise a method of improving the adherence of the coating. Nozzles of a shape depicted in the drawing are particularly well suited for the practice of the present invention. Other shapes where alumina buildup is a problem, such as collector nozzles, slide gate inserts and the like, are also suitable.

Referring to the drawing, a submerged entry nozzle 2 according to the invention is depicted. The nozzle 2 includes a body 4 of an isostatically pressed and fired, carbon-bonded, oxide based refractory material, such as a conventional, carbon-bonded alumina-graphite. A typical composition for body 4 may include the following constituents in % by weight: 32% C; 52% $Al_2O_3$; 14% $SiO_2$; and 2% other additions. The above carbon is derived principally from the graphite plus a lesser amount from the carbonaceous binder, such as pitch or resin.

The nozzle body 4 has a teeming orifice or bore 6 extending axially therethrough. The bore 6 extends from a top flanged end 8 of the nozzle and terminates at a floor or blind end 10 near the bottom end 12 of the nozzle. A plurality of casting orifices 14 extend outwardly through the body 4 communicating with the bore 6 adjacent the floor 10 to permit the delivery of molten steel to a continuous casting mold (not shown). A slagline sleeve 16 of an erosion and corrosion resistant refractory such as, for example, zirconia-graphite is isostatically compressed and fired with the body 4. The nozzle 2 thus far described is conventional and well-known in the art. Such a conventional, carbon-bonded nozzle is fired or burned after pressing in a reducing or otherwise non-oxidizing atmosphere at a temperature of about 1,000° C. for a period of one hour or more. The controlled, non-oxidizing furnace atmosphere is conventionally used in order to protect the carbon bond as the refractory body sinters/densifies during firing.

In the practice of the present invention, the pressed nozzle 2 is fired in an oxidizing furnace atmosphere to produce a porous, carbon free, oxidized zone 18 in the interior, metal contacting surfaces of the body 4 surrounding the bore 6 and around the orifices 14. In order to protect the balance of the exterior surface portions of the body 4 against oxidation during firing under these furnace conditions, the exterior body surfaces are coated with a glaze 19. The glaze 19 is formed by a conventional glass forming frit material. Such glaze forming frits are well-known in the art. The glaze 19 may be applied in a thickness up to about 5 mm (millimeters), with a thickness of 3 mm being presently preferred.

The firing schedule along with the particle size distribution of the raw material mix for body 4 are controlled to obtain the desired pore size in the carbon depleted, oxidized zone 18 and to achieve the desired depth or thickness in the oxidized zone. As is well-known in the art, the pore size of the fired refractory product may be altered by changing the ratio of coarse to fines in the mix such that a higher ratio of coarse to fines yields a larger pore size, and conversely, a lower ratio yields a smaller pore size. The firing step in the oxidizing atmosphere is preferably conducted at a temperature of about 1,000° C. for about two hours. This firing schedule produces an oxidized zone 18 having a depth on the order of 2-3 mm. An optimal depth for zone 18 is greater than 1 mm, but no greater than about 5 mm. A presently preferred depth for the oxidized zone 18 is about 2 mm.

During the firing treatment, the surface of the unglazed bore 6 of the body 4 is exposed to the oxidizing furnace atmosphere. The oxygen containing atmosphere reacts with the carbon bond around the bore 6 of the refractory body 4 which develops a greater porosity within the oxidized zone 18 by virtue of the depleted carbon exiting in the form of CO(g). An open pore size of a controlled dimension of between about 10-70 microns is obtained in the zone 18. A more preferred pore size is between about 35-45 microns. A presently preferred optimal pore size is about 40 microns for the purpose of maximizing the infiltration of the carbon free refractory slurry into the oxidized zone 18, as will be explained in greater detail hereinafter. The infiltrated refractory then forms an anti-buildup liner 20 coextensively within the oxidized zone 18.

The refractory slurry for infiltration into the oxidized zone 18 is preferably material which contains no carbon and may comprise any refractory material that has high temperature and high erosion resistance characteristics. Examples of such presently preferred carbon free refractory materials useful as a slurry infiltrant are alumina, silica, zirconia, SiAlON and the like. The most presently preferred slurry infiltrant is alumina.

A refractory slurry for the liner 20 infiltrant is prepared using a fine refractory powder in an organic/water vehicle. The most preferred infiltrant, alumina, is prepared as a slurry having a preferred composition of 50–65% by weight alumina powder with the balance predominantly water. The alumina powder has an average particle diameter of between about 0.1–1.0 microns and a surface area of between about 2 and 8 $m^2/gm$. The fired refractory nozzle 2 is preferably submerged into the slurry and the system is evacuated to a pressure below atmospheric (less than 1 atm) for at least 15 minutes. This vacuum treatment has the effect of removing entrapped oxygen from the pores of the oxidized refractory in zone 18. The system is then re-pressurized, which forces the slurry into the evacuated pores of the zone 18. The nozzle 2 is then removed from the slurry and the organic/water is driven off through a low temperature cure such that the organic/water from the slurry volatizes. Since the nozzles are generally preheated prior to use, this curing step may be eliminated. As stated above, the vacuum/pressure infiltration technique is not absolutely necessary since the slurry will infiltrate the porous, oxidized zone without external pressurization, however, such external treatment is preferred since it reduces the time required to achieve proper infiltration.

The impregnated, carbon free liner 20 provides a reduction of the overall gas permeability of the fired refractory body. For the alumina slurry infiltrant used in the above procedure, the refractory material exhibits a significant reduction in permeability. A conventionally fired, alumina-graphite body 4 has a permeability on the order of about 40 liters per minute (1 pm) at 1 bar pressure. By way of comparison, the body 4 having an oxidized zone 18 prior to infiltration has a permeability of about 50 lpm. The body 4 after infiltration has a permeability of only 2 lpm. Of course, these values may be different for other refractory/slurry compositions, but it is the significant reduction in permeability resulting from infiltration that is deemed important.

The physical properties of the refractory also tend to change after oxidation and infiltration. The following table reports representative physical properties for the above system. The modulus of rupture is measured using a three-point bending technique, in which bars of the samples, approximately 2" long by 0.75" square, are loaded horizontally. The load that is required to break the sample is used in conjunction with the sample dimensions and the load span in order to obtain a rupture value in pounds per square inch (psi). This is a conventional testing technique. It is observed that the infiltrated sample exhibits a higher strength for the system above.

TABLE

| Material | Vertical MOR (psi) | Horizontal MOR (psi) |
| --- | --- | --- |
| 1. Alumina/graphite | 1101 | 1368 |
| 2. Oxidized zone alumina/graphite | 819 | 834 |
| 3. Slip infiltrated alumina/graphite | 1224 | 1553 |

In summary, it will be apparent that the anti-buildup liner 20 of the invention reduces alumina buildup by blocking one of the prominent alumina formation mechanisms, namely, CO(g) generation, by eliminating the carbon from the liner 20 and by reducing the permeability of the porous oxidized zone 18 of the refractory body 4 along the steel contacting surfaces thereof. In order to increase adhesion of the liner 20 and reduce spalling, the refractory material is infiltrated into the porous, oxidized zone 18 of the body 4. In order to enhance coating wettability and increase coating adhesion, the carbon is removed from the surface to be infiltrated, preferably through oxidation. In service, molten steel contacts the liner 20 causing the infiltrated refractory material, such as alumina, to sinter immediately. This further lowers the permeability of the liner 20 and increases its mechanical integrity.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A carbon-bonded refractory body having a metal contacting surface resistant to alumina buildup, said surface consisting essentially of a carbon free, oxidized zone formed in said surface and a carbon free refractory material infiltrated into said carbon free, oxidized zone.

2. The refractory body of claim 1 wherein the infiltrated layer of carbon free refractory material is one selected from the group consisting of alumina, silica, zirconia and SiAlON.

3. The refractory body of claim 2 wherein the refractory material of the infiltrated layer is alumina and wherein the layer has a depth of between about 1 mm to about 5 mm.

4. The refractory body of claim 1 wherein the body is made of carbon-bonded, alumina-graphite refractory material and wherein the infiltrated layer of refractory material is alumina.

5. The refractory body of claim 4 in the form of a submerged entry nozzle for use in casting aluminum-killed steel.

6. A refractory nozzle for use in casting aluminum-killed steel comprising:
   a body made from a fired, carbon-bonded, alumina-graphite refractory material, said body having a metal teeming bore therethrough;
   a glazed layer covering surface portions of said body external of said bore;
   a carbon free, oxidized zone formed in said body surrounding said bore; and
   a layer of refractory material infiltrated into said oxidized zone, said refractory material selected from the group consisting of alumina, silica, zirconia and SiAlON, whereby in use said infiltrated refractory layer resists buildup of alumina thereon.

7. The nozzle of claim 6 wherein the oxidized zone has a depth of between about 1 mm to about 5 mm.

8. The nozzle of claim 6 wherein the oxidized zone has a depth of about 2 mm to about 3 mm.

9. The nozzle of claim 6 wherein the infiltrated refractory material is alumina.

10. The nozzle of claim 6 including a slagline sleeve positioned around said body.

11. A method for making a refractory article having a metal contacting surface resistant to steel erosion and buildup of alumina when casting aluminum-killed steels comprising:

forming a shaped body of a carbon containing refractory material;

applying a glaze to selected surface portions of said body, said erosion and buildup resistant surface being free of said glaze;

firing said selectively glazed body in an oxidizing atmosphere to densify said body;

forming an oxidized zone in the body along the glaze free surface thereof; and infiltrating said oxidized zone with a carbon free refractory material.

12. The method of claim 11 wherein the infiltrating step is carried out by submerging said fired body within an enclosure in a slurry containing the carbon free refractory material;

applying a vacuum to the enclosure to remove a residual gas from the oxidized zone; and applying a pressure to the enclosure to cause infiltration of said slurry into the oxidized zone.

13. The method of claim 11 wherein the oxidized zone has a pore size after the firing step and prior to said infiltrating step of between about 35 microns to about 45 microns.

14. The method of claim 11 wherein the firing step is carried out at about 1,000° C. for about two hours.

15. The method of claim 11 including a curing step to remove volatizable constituents from the infiltrated slurry.

16. The method of claim 11 wherein the carbon free refractory material is one selected from the group consisting of alumina, silica, zirconia and SiAlON.

17. The method of claim 11 wherein the carbon free refractory material is alumina.

18. A refractory nozzle for use in casting steel comprising:

a body made from a fired, carbon-bonded, alumina-graphite refractory material, said body having a metal teeming bore therethrough;

a carbon free, oxidized zone formed in said body surrounding said bore; and a layer of carbon free refractory material infiltrated into said carbon free oxidized zone, whereby in use said infiltrated refractory layer resists buildup of oxide deposits thereon.

19. The refractory nozzle of claim 18 wherein the infiltrated layer of carbon free refractory material comprises at least one selected from the group consisting of alumina, silica, zirconia and SiAlON.

* * * * *

UNITED STATES PATENT AND TRADEMARK OFFICE
CERTIFICATE OF CORRECTION

PATENT NO. : 5,370,370
DATED : December 6, 1994
INVENTOR : Paul M. Benson

It is certified that error appears in the above-indentified patent and that said Letters Patent is hereby corrected as shown below:

Title page, item [56], References Cited, FOREIGN PATENT DOCUMENTS, "2110971 6/1983 Japan ." should read --2110971 6/1983 United Kingdom .--.

Column 3 Line 43 before "zone" insert --oxidized--.

Column 3 Line 63 "impressed" should read --isopressed--.

Column 7 Line 22 after "then" delete the new paragraph spacing, as it is one continuous sentence.

Claim 18 Line 25 Column 10 after "free" insert --,--.

Signed and Sealed this

Twenty-first Day of February, 1995

Attest:

BRUCE LEHMAN

Attesting Officer     Commissioner of Patents and Trademarks